United States Patent
Aguilar et al.

(10) Patent No.: US 6,636,918 B1
(45) Date of Patent: Oct. 21, 2003

(54) MOBILE COMPUTING DEVICE AND ASSOCIATED BASE STATIONS

(75) Inventors: Maximino Aguilar, Austin, TX (US); Sanjay Gupta, Austin, TX (US); Roy Moonseuk Kim, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 09/606,638

(22) Filed: Jun. 29, 2000

(51) Int. Cl.$^7$ ............................................. G06F 13/00
(52) U.S. Cl. ...................................... 710/303; 361/683
(58) Field of Search ................................ 710/303, 304; 361/683, 686

(56) References Cited

U.S. PATENT DOCUMENTS

| | | | | |
|---|---|---|---|---|
| 5,884,049 A | * | 3/1999 | Atkinson | 710/303 |
| 5,999,952 A | * | 12/1999 | Jenkins et al. | 708/100 |
| 6,029,183 A | * | 2/2000 | Jenkins et al. | 708/100 |
| 6,073,136 A | * | 6/2000 | Bertram et al. | 707/104.1 |
| 6,170,026 B1 | * | 1/2001 | Kimura et al. | 710/104 |
| 6,309,230 B2 | * | 10/2001 | Helot | 361/683 |
| 6,407,914 B1 | * | 6/2002 | Helot | 710/303 |

OTHER PUBLICATIONS www.whatis.com, "system–on–a–chip" definition, Feb. 5, 2003.*

* cited by examiner

Primary Examiner—Glenn A. Auve
(74) Attorney, Agent, or Firm—Joseph P. Lally; John D. Flynn; Casimer K. Salys

(57) ABSTRACT

A mobile computing device and associated base stations are disclosed. The mobile computing device includes a system-on-chip (SOC) device that includes a general purpose processor core and a plurality of peripheral cells suitable for controlling a plurality of peripheral units. The mobile computing device further includes a system memory and a base unit interface. The base unit interface is suitable for connecting the mobile computing device to a base unit that includes a display adapter suitable for controlling a video display. The SOC is connected to and enabled to control the display adapter when the mobile computing device is connected to the base unit. The base unit interface may comprise a PCI interface that connects the SOC device to the base unit via a PCI bus. The plurality of peripheral units may include an audio adapter, a flash device, a wireless suitable for transmitting and receiving wireless information, and a liquid crystal display suitable for displaying text messages. The mobile device preferably further includes a battery suitable for powering the mobile computing device. The base unit suitably includes an interface configured to connect to the base unit interface of the mobile computing device and a display adapter enabled to control a display. The display adapter is connected to the interface unit via a peripheral bus that is connected to the SOC when the mobile computing device and the base unit are connected. The base unit may comprise a desktop base unit that includes a hard disk adapter, a CD ROM drive, a floppy diskette drive, a network device base unit that includes a network adapter, controlled by the SOC, that enables the base unit to communicate with a network server, or an internet appliance base unit that includes a modem controlled by the SOC and configured to enable the system to connect to the internet.

14 Claims, 3 Drawing Sheets

MOBILE COMPUTING DEVICE AND ASSOCIATED BASE STATIONS

BACKGROUND

1. Field of the Present Invention

The present invention generally relates to the field of data processing systems and more particularly to a mobile data processing system designed for use with various base station units to form various systems for different applications.

2. History of Related Art

The number of applications for which data processing systems are useful is increasing rapidly. Until fairly recently, conventional desktop and laptop personal computers were used to address applications of widely varying scope and complexity. For some applications, these desktops systems typically were undesirably slow and inefficient while, for other applications such as simple data processing, the desktop system was often more than sufficient for the tasks. There was little differentiation between systems based upon the desired application. All systems typically included the same basic components such as an expensive general purpose microprocessor, system memory, display, input devices, and some form of mass storage such as a hard disk.

With the recent increase in network computing applications, wireless information transfer, and internet applications, the number of applications for which data processing systems are employed has increased correspondingly. To address this increase in computing applications, data processing device manufacturers have paid more attention to the design of various devices based upon the intended application. Network computers that lack significant mass storage capacity, as an example, are now routinely designed for networking applications in which it is presumed that the vast bulk of data will be stored on some form of network or distributed storage. Despite activity of this type, however, there exists a lack of systems designed for specific applications such as low cost information retrieval.

Simultaneously with the increase in computing applications, semiconductor device technology has increased to the point that significant computing power in the form of system-on-chip designs are now available at a fraction of the cost and size of conventional general purpose microprocessors. It would be highly desirable to implement available and low cost processing power in systems designed, targeted, and optimized for specific applications. It would be further desirable if the implemented solution leveraged, to the extent possible, a common module or core that could be transported and used with various attachment units to form various systems. It would be still further desirable if the common unit were functional as a stand-alone and portable data processing device.

SUMMARY OF THE INVENTION

The problems identified above are in large part addressed by the mobile computing device and associated base stations disclosed herein. The mobile computing device includes a system-on-chip (SOC) device that includes a general purpose processor core and a plurality of peripheral cells suitable for controlling a plurality of peripheral units. The mobile computing device further includes a system memory and a base unit interface. The base unit interface is suitable for connecting the mobile computing device to a base unit that includes a display adapter or graphics adapter suitable for controlling a video display. The SOC is connected to and enabled to control the display adapter when the mobile computing device is connected to the base unit. The base unit interface may comprise a PCI interface that connects the SOC device to the base unit via a PCI bus. The plurality of peripheral units may include an audio adapter, a flash device, a wireless suitable for transmitting and receiving wireless information, and a liquid crystal display suitable for displaying text messages. The mobile device preferably further includes a battery suitable for powering the mobile computing device. The base unit suitably includes an interface configured to connect to the base unit interface of the mobile computing device and a display adapter enabled to control a display. The display adapter is connected to the interface unit via a peripheral bus that is connected to the SOC when the mobile computing device and the base unit are connected. The base unit may comprise a desktop base unit that includes a hard disk adapter, a CD ROM drive, a floppy diskette drive, a network device base unit that includes a network adapter, controlled by the SOC, that enables the base unit to communicate with a network server, or an internet appliance base unit that includes a modem controlled by the SOC and configured to enable the system to connect to the internet.

BRIEF DESCRIPTION OF THE DRAWINGS

Other objects and advantages of the invention will become apparent upon reading the following detailed description and upon reference to the accompanying drawings in which.

Figure 1:
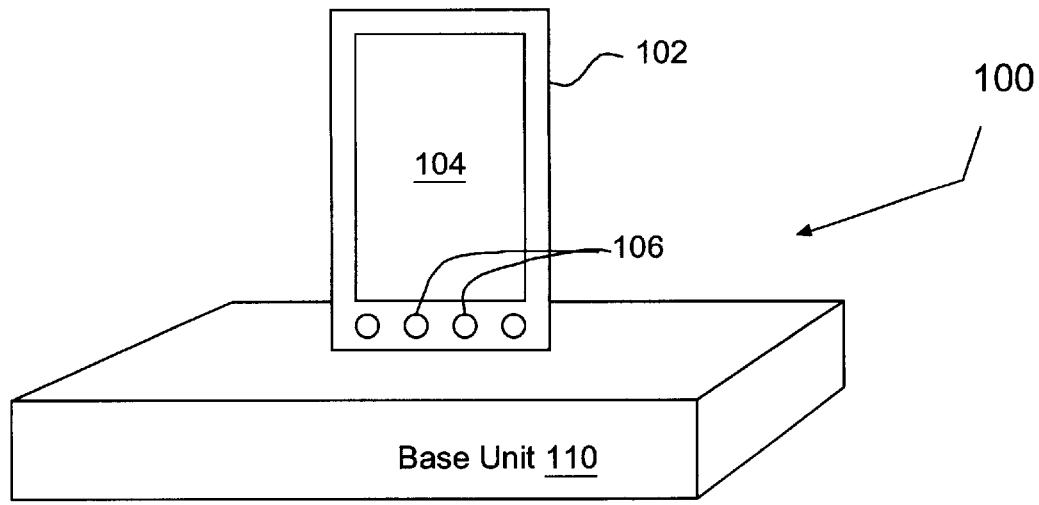
FIG. 1 is a simplified block diagram of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 depicts a data processing system 100 according to one embodiment of the present invention. Generally speaking, the invention contemplates a mobile computing device that contains sufficient processing capability to drive various base units including a desktop type base unit, a network appliance type base unit, and a network computer type base unit. Because the processing capability driving each of the base units is provided by a single, common mobile computing device, the invention is capable of lowering overall computing cost by eliminating redundant instances of expensive processing functionality. Whereas a typical user may have a desktop PC at home, a network computer at work, and an internet appliance at home, each with its own processing unit, the mobile computing device of the present invention enables a user to drive each of these base devices with a single portable device with self contained processing power. Moreover, by providing the processing power and functionality in the mobile device itself, the mobile device serves as a portable data processing unit that gives the user constant access to remote data.

As depicted in FIG. 1, data processing system 100 includes a mobile computing device 102 and a base unit 110 to which the mobile computing device is attached. The base unit 110 may assume any of a variety of implementations as described in greater detail below. The mobile computing device 102 includes a display screen 104 and may include various input devices such as the buttons 106 depicted in FIG. 1 for controlling various functions of the mobile computing device such as initiating retrieval of email.

Figure 2:
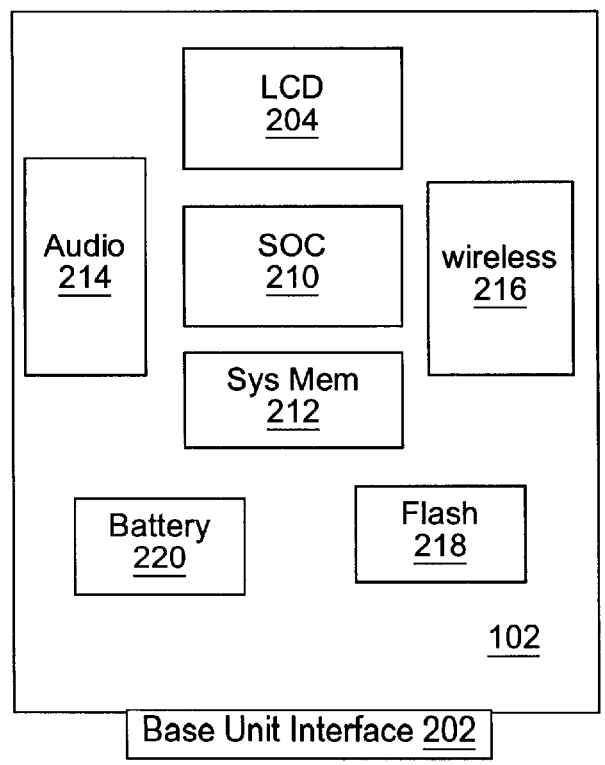
FIG. 2 is a block diagram of a mobile computing device according to one embodiment of the invention.

In FIG. 2, a block diagram illustrating greater detail of the mobile computing device 102 is depicted. Mobile computing device 102 is driven by a system-on-a-chip (SOC) 210. The SOC 210 may comprise an embedded microprocessor that combines a general purpose microprocessor core section with a collection of various peripheral cells to extend the PC architecture model into new applications that focus on low cost information and multimedia appliances. SOC 210 typically includes, in addition to a general purpose microprocessor core section, a memory controller, an I/O bus interface such as a PCI interface, a DMA controller, and an interrupt controller. SOC 210 may be implemented with a commercially distributed component available from various semiconductor manufacturers including the PowerPC® 405GP Embedded Processor from IBM Corporation, the STPC family of embedded microprocessors available from ST Microelectronics, and the Geode™ SC1400 device from National Semiconductor. The SOC general purpose core section may be compatible various microprocessor architectures including the PowerPC® architecture from IBM Corporation, the MIPS® architecture from MIPS Technologies, Inc., and the x86 architecture familiar to those in the field of microprocessor based data processing systems. The inclusion of a general purpose microprocessor core cell enables mobile computing device 102 far greater processing capability than is currently available in conventional handheld mobile computing devices.

The depicted embodiment of SOC 210, in addition to including a suitable processor core cell, includes multiple peripheral cells designed to control various components of mobile computing device 102 including a system memory 212 (DRAM or SRAM), a wireless communication cell 216 suitable for transmitting and receiving wireless signals, and an audio cell 214 that is suitable for generating audio output and is suitable for playing files that are formatted in audio formats such as WAV, MIDI, and MP3. Mobile computing device 102 may further include a liquid crystal display (LCD) 204 that is capable of displaying text messages and other images and which may provide the user with an LCD touch screen for inputting various commands. In the depicted embodiment, mobile computing device 102 includes a battery 220 that supplies power for mobile computing device 102 and non-volatile storage capacity in the form of a compact flash 218. Compact flash 218 may contain sufficient mobile computing device operating system software to enable operation of the mobile computing device 102 apart from one of the various base units described below. Thus, mobile computing device 102 may be enabled to operate as a stand alone unit for various applications including electronic scheduling and organizing, receiving and delivering email, internet browsing, form/fill transactions, and various other applications. In another embodiment, the compact flash unit 218 contains operating system software or boot code copied from one of the base units.

Mobile computing device 102 also includes a base unit interface 202 that facilitates the interconnection between mobile computing device 102 and a corresponding base unit 110. In one embodiment, the base unit interface 202 may comply with the physical and electrical characteristics of a high performance I/O bus such as the peripheral components interface (PCI) bus to provide a direct and high speed connection between mobile computing device 102 and a corresponding base unit 110. The PCI specification is documented in *PCI Local Bus Specification Rev.* 2.2, which is available from the PCI Special Interest Group at www.pcisig.com, and is incorporated by reference herein.

Figure 3:
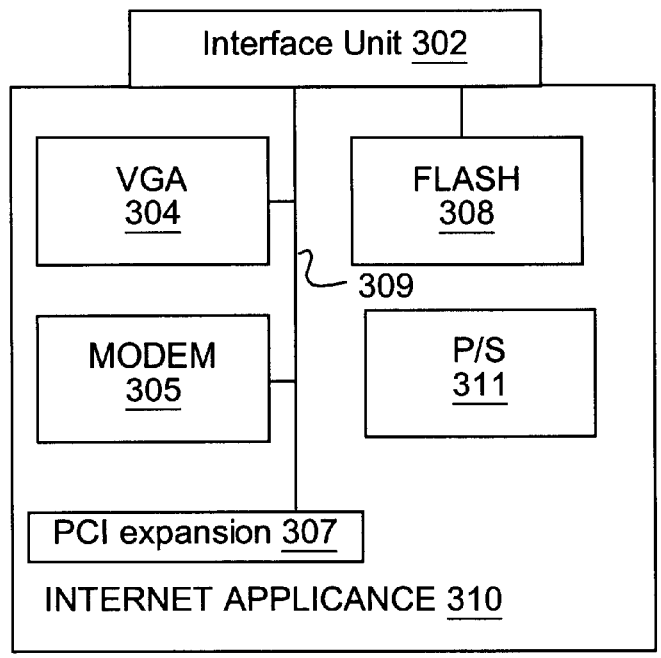
FIG. 3 is a block diagram of an internet appliance base station suitable for use with the mobile computing device of FIG. 2.
Figure 4:
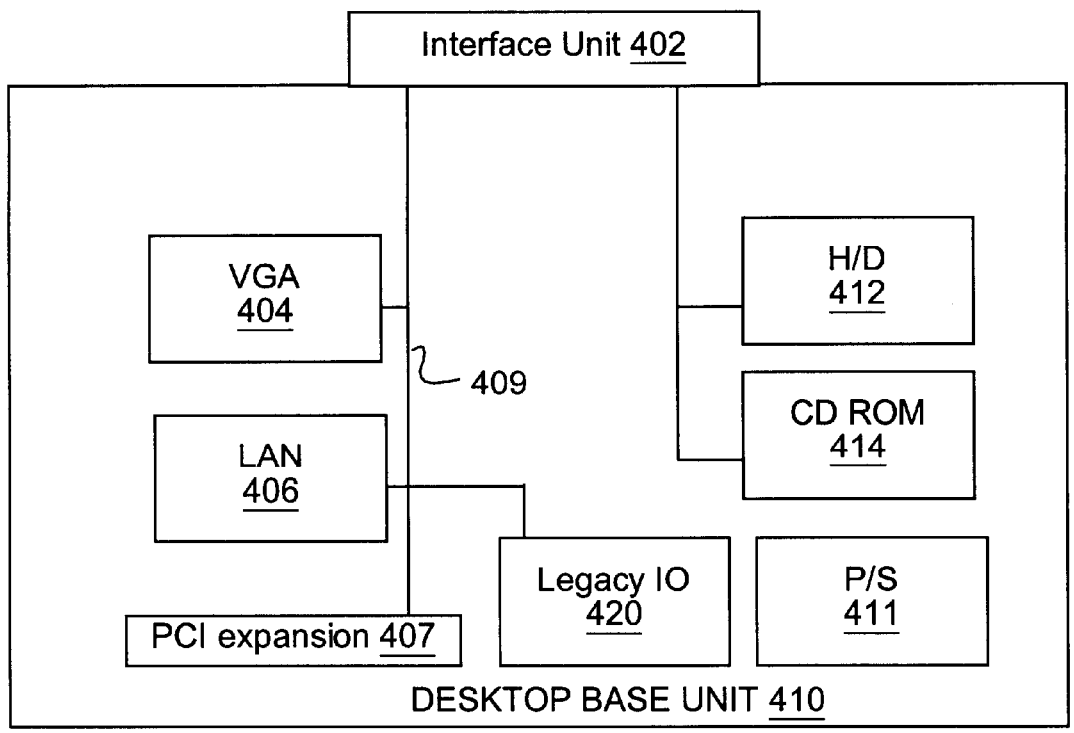
FIG. 4 is a block diagram of a desktop platform base unit suitable for use with the mobile computing device of FIG. 2.
Figure 5:
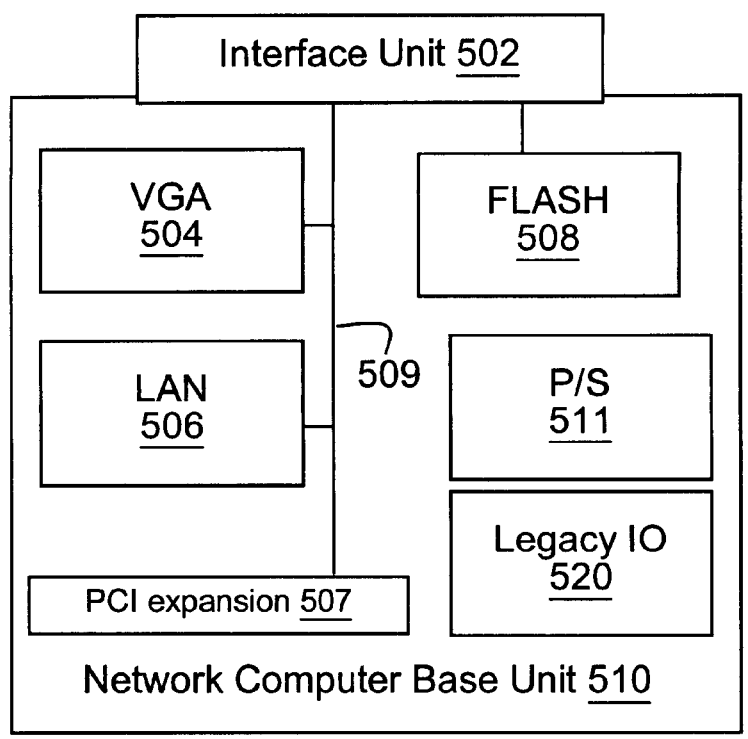
FIG. 5 is a simplified block diagram of a network computer base station suitable for use with the mobile computing device of FIG. 2.

Turning now to FIGS. 3–5, various embodiments of base unit 110 suitable for use with mobile computing device 102 are depicted and identified by reference numerals 310, 410, and 510 respectively. In FIG. 3, an internet appliance base unit 310 is depicted. In this embodiment, the base unit 110 includes a base unit interface 302 that is configured to interconnect with the base unit interface 202 of mobile computing device 102. The internet appliance base unit 310 depicted in FIG. 3 includes a variety of peripheral units including a display adapter 304, a modem 305, and a PCI expansion slot 307 that are interconnected via a common bus 309. In addition, internet appliance base unit 310 may include a compact flash device 308 that may contain internet appliance operating system software. A power supply 311 drives the various components of base unit 310. When connected to each other via their corresponding base unit interfaces, the combination of mobile computing device 102 and internet appliance base unit 110 serve as an internet appliance device typically designed for enabling a consumer or home user access to the internet via modem 305. Thus, a user may connect mobile computing device 102 to internet appliance base unit 110 as depicted in FIG. 3 and access the internet via modem 305. In this manner, the mobile computing device 102 provides a low cost and effective method of enabling consumer users access to the internet without unnecessarily encumbering the base unit 110 depicted in FIG. 3 with expensive components such as a general purpose microprocessor or a hard drive.

Turning now to FIG. 4, a desktop platform base unit 410 according to one embodiment of the present invention and suitable for use with mobile computing device 102 is depicted. In this embodiment, base unit 410 includes a base interface unit 402 that is suitably designed to connect to the base unit interface 202 of mobile computing device 102. In addition to a display adapter 404 and a network adapter 406 that enables desktop platform base unit 410 to connect to a local area network, base unit 410 as depicted in FIG. 4 typically further includes a hard disk 412, a CD ROM drive 414, and a floppy diskette drive (not specifically depicted).

A PCI expansion slot 407 enables PCI expansion adapters to be added to base unit 110. A power supply 411 drives the various units of base unit 410. A legacy I/O unit 420 provides support for a conventional keyboard, mouse, and serial port via an Industry Standard Architecture (ISA) or other suitable bus. When mobile computing device 102 is interconnected with desktop platform base unit 410 as depicted in FIG. 4, the user has access to substantially all of the resources that are typically found in a conventionally packaged desktop, microprocessor based computer system. The desktop platform base unit 410, however, will typically be less expensive than a conventional desktop box because the processing capability is provided by SOC 210 of mobile computing device 102. In an embodiment where the bus 409 to which the various peripheral adapters of desktop platform base unit 410 are connected is implemented as a PCI bus, the processing power provided by SOC 210 is available over a high speed and direct local bus. In contrast, conventional handheld and portable computing devices are typically coupled to a desktop, laptop, or other suitable personal computer via a standardized serial port. It will be appreciated to those familiar with microprocessor based computer architecture that the serial connection between conventional handheld computing devices is significantly slower than the PCI connection between handheld computing device 102 and desktop platform base unit 410 as described herein.

Turning now to FIG. 5, a network computer embodiment base unit 510 is depicted. Network computer base unit 510 as depicted in FIG. 5 includes a base interface unit 502 suitable for connecting to base interface unit 202 of mobile computing device 102. The network computer base unit 510 may further include various peripheral adapters including a display adapter 504 and a network adapter 506 that are typically connected to a PCI local bus 509. In the depicted embodiment, network computer base unit 510 includes a PCI expansion slot 507 suitable for connecting additional peripheral adapters to expand the capabilities of the system. Typically, network computer base unit 510 may include a compact flash unit 508 that contains a network operating system or boot code sufficient for retrieving operating system software from a network server via the network adapter 506, which may be implemented as an Ethernet card (or other network adapter) suitable for connecting to a local area network. A power supply 511 provides power to the various units of base unit 510. Unlike the desktop platform base unit 410 described with respect to FIG. 4, the network computer base unit 510 as depicted in FIG. 5 typically does not have a hard disk adapter, a CD ROM adapter, or a floppy diskette drive. A legacy I/O unit 520 may provide support for various peripheral devices including, as examples, a keyboard, a mouse, or a serial port. When connected to mobile computing device 102, network computer base unit 510 as depicted in FIG. 5 forms a network computer system or thin client device that is suitable for use in a network environment. As an example, the combination of network computer base unit 510 and mobile computing device 102 may be implemented as a terminal in a Windows server system.

Thus, the mobile computing device 102 provides a common device for connecting to a variety of base units 110 for forming a variety of system types designed for differing applications. By incorporating the processing power of the various systems into mobile computing device 102, the overall cost of the various systems is reduced by minimizing the amount of circuitry that is replicated while enabling the mobile device to function as a portable and stand alone data processor. In addition, the PCI connection between mobile computing device 102 and the various base units 110 in the preferred embodiments of the system greatly improves the processing ability of the mobile device when used in conjunction with one of the base stations.

It will be apparent to those skilled in the art having the benefit of this disclosure that the present invention contemplates a mobile computing device and various base unit devices suitable for attaching to the mobile computing device for creating various system types. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A mobile computing device, comprising:
   a system-on-chip (SOC) device comprising a general purpose processor core and a plurality of peripheral cells suitable for controlling a plurality of peripheral units;
   a system memory;
   a base unit interface suitable for connecting the mobile computing device to a base unit that includes a display adapter suitable for controlling a video display, wherein the SOC is enabled to control the display adapter when the mobile computing device is connected to the base unit; and
   a power source to power the mobile computer device for standalone operation.

2. The mobile computing device of claim 1, wherein the base unit interface comprises a PCI interface that connects the SOC device to the base unit via a PCI bus.

3. The mobile computing device of claim 1, wherein the SOC processor core comprises an x86 compatible processor core.

4. The mobile computing device of claim 1, wherein the plurality of peripheral unit cells includes an audio adapter cell.

5. The mobile computing device of claim 1, further comprising a wireless unit connected to the processor and suitable for transmitting and receiving wireless information.

6. The mobile computing device of claim 5, further comprising a flash device containing mobile device system software to enable the device to perform standalone tasks including email and Internet browsing.

7. The mobile computing device of claim 1, further comprising a liquid crystal display suitable for displaying text messages.

8. The mobile computing device of claim 1, wherein the power source comprises a battery.

9. A data processing system comprising:
   a mobile computing device comprising a system-on-chip (SOC) device including a general purpose processor core and a plurality of peripheral cells suitable for controlling a plurality of peripheral units, a system memory, a base unit interface suitable for connecting the mobile computing device to a base unit, and a power source to power the mobile device for standalone operation, and a base unit including a display adapter suitable for controlling a video display and an interface unit suitable for connecting to the base interface unit of the mobile computing device, wherein the SOC is enabled to control the display adapter when the mobile computing device is connected to the base unit.

10. The system of claim 9, wherein the base unit is characterized as a desktop base unit including a hard disk adapter and a CD ROM drive.

11. The system of claim 10, wherein the interface unit is a PCI compatible interface and the mobile computing device SOC is connected to the base unit interface via a PCI bus.

12. The system of claim 9, wherein the base unit is characterized as a network device base unit including a network adapter controlled by the mobile computing device SOC and enabling the base unit to communicate with a network server.

13. The system of claim 12, where the base unit further includes a flash device containing network operating system software.

14. The system of claim 9, wherein the base unit is further characterized as an internet appliance base unit including means controlled by the mobile computing device SOC to enable the system to connect to the internet.

* * * * *